(12) United States Patent
Geier et al.

(10) Patent No.: US 8,240,647 B2
(45) Date of Patent: Aug. 14, 2012

(54) CLAMPING OR SPREADING TOOL

(75) Inventors: Manfred Geier, Puchheim (DE); Ralf Strauss, Worthsee (DE); Phil Reed, Sheffield (GB)

(73) Assignee: Irwin Industrial Tools GmbH, Hallbeergmoos (DE)

( * ) Notice: Subject to any disclaimer, the term of this patent is extended or adjusted under 35 U.S.C. 154(b) by 242 days.

(21) Appl. No.: 12/774,516

(22) Filed: May 5, 2010

(65) Prior Publication Data

US 2010/0276860 A1 Nov. 4, 2010

Related U.S. Application Data

(63) Continuation of application No. 11/936,439, filed on Nov. 7, 2007, now Pat. No. 7,735,813, which is a continuation of application No. 10/576,091, filed as application No. PCT/EP2004/014179 on Dec. 13, 2004, now Pat. No. 7,651,078.

(30) Foreign Application Priority Data

| Dec. 12, 2003 | (DE) | 103 58 291 |
| Dec. 12, 2003 | (DE) | 103 58 296 |
| Dec. 12, 2003 | (DE) | 103 58 301 |
| Dec. 12, 2003 | (DE) | 103 58 302 |
| Dec. 12, 2003 | (DE) | 103 58 303 |
| Dec. 12, 2003 | (DE) | 103 58 304 |

(51) Int. Cl.
   *B25B 5/06* (2006.01)

(52) U.S. Cl. ............. 269/254 CS; 269/3; 269/6

(58) Field of Classification Search ............ 269/254 CS, 269/170, 95, 147–149, 166–171.5; 29/255, 29/278, 270, 244; 74/473.15
See application file for complete search history.

(56) References Cited

U.S. PATENT DOCUMENTS

| 100,642 | A | 3/1870 | Lambert |
| 153,206 | A | 7/1874 | Wagoner |
| 226,617 | A | 4/1880 | Konig |
| 267,152 | A | 11/1882 | Cloud |
| 376,623 | A | 1/1888 | Bain |
| 404,368 | A | 5/1889 | Stearns |
| 408,473 | A | 8/1889 | Focken |
| 410,815 | A | 9/1889 | Tarbell |
| 416,096 | A | 11/1889 | Dom |

(Continued)

FOREIGN PATENT DOCUMENTS

AU 225561 4/1959

(Continued)

OTHER PUBLICATIONS

Advertisement for Bessey Bar Clamps Styles 43 and 45. Publication source and date unknown. It is believed that this publication was available to the public prior to Jul. 15, 1993.

(Continued)

*Primary Examiner* — Lee D Wilson
(74) *Attorney, Agent, or Firm* — Marshall, Gerstein & Borun LLP

(57) ABSTRACT

A clamping and/or spreading tool comprises a drive for displacement of a push or pull rod to which a movable jaw is fixed with respect to a support carrying a stationary jaw in longitudinal direction of the push and pull rod, the drive comprising a torsion spring and being adapted to enter torque transmitting engagement with the push or pull rod for displacement of the same.

18 Claims, 9 Drawing Sheets

U.S. PATENT DOCUMENTS

| | | | |
|---|---|---|---|
| 491,633 A | 2/1893 | Bourassa | |
| 678,805 A | 7/1901 | Weyland | |
| 749,732 A | 1/1904 | Hanson et al. | |
| 757,166 A | 4/1904 | Wintsch, Jr. | |
| 775,659 A | 11/1904 | Jorgensen | |
| 792,758 A | 6/1905 | Colt | |
| 927,067 A | 7/1909 | Offineer | |
| 934,589 A | 9/1909 | Bradford | |
| 1,241,215 A | 9/1917 | Hoffman | |
| 1,340,092 A | 5/1920 | Tuscher, Jr. | |
| 1,393,766 A | 10/1921 | Du Charme | |
| 1,402,621 A | 1/1922 | Knittel et al. | |
| 1,452,753 A | 4/1923 | Otto et al. | |
| 1,543,197 A | 6/1925 | Ulrich | |
| 1,583,611 A | 5/1926 | Seely | |
| 1,639,561 A | 8/1927 | Hargrave | |
| 1,772,301 A | 8/1930 | Barker | |
| 1,783,713 A | 12/1930 | Holman | |
| 1,811,518 A | 6/1931 | Palmer | |
| 1,890,042 A | 12/1932 | Morandi | |
| 2,133,892 A | 10/1938 | Gelinski | |
| 2,157,345 A | 5/1939 | Nelson | |
| 2,200,518 A | 5/1940 | Perbal | |
| 2,468,358 A | 4/1949 | Clark | |
| 2,656,864 A | 10/1953 | Hopfeld | |
| 2,781,803 A | 2/1957 | Nelson | |
| 2,815,053 A | 12/1957 | Walker | |
| 2,815,778 A | 12/1957 | Holman | |
| 2,923,334 A | 2/1960 | Brennan, Jr. | |
| 2,949,947 A | 8/1960 | Story | |
| 3,033,559 A | 5/1962 | Lindholm | |
| 3,159,393 A | 12/1964 | Villano | |
| 3,173,674 A | 3/1965 | Ringle | |
| 3,331,111 A | 7/1967 | Carver | |
| 3,575,405 A | 4/1971 | Harding | |
| 3,596,898 A | 8/1971 | Hilburn | |
| D222,872 S | 1/1972 | Boucher | |
| D227,192 S | 6/1973 | Schafhauser | |
| 3,806,107 A | 4/1974 | Pitzer et al. | |
| 3,914,830 A | 10/1975 | Bolton | |
| D238,140 S | 12/1975 | Guimarin | |
| 3,933,346 A | 1/1976 | Carver | |
| 3,963,230 A | 6/1976 | Jankowski, Jr. | |
| 4,042,264 A | 8/1977 | Shumer | |
| 4,078,781 A | 3/1978 | Fraser et al. | |
| 4,083,548 A | 4/1978 | Hackbarth | |
| 4,088,313 A | 5/1978 | Pearson | |
| 4,132,397 A | 1/1979 | Ward | |
| 4,143,869 A | 3/1979 | Paterson et al. | |
| D259,327 S | 5/1981 | Sloane | |
| 4,306,710 A | 12/1981 | Vosper | |
| 4,339,113 A | 7/1982 | Vosper | |
| 4,381,105 A | 4/1983 | Goff et al. | |
| 4,524,650 A | 6/1985 | Marks | |
| D279,646 S | 7/1985 | Ferdinand et al. | |
| 4,563,921 A | 1/1986 | Wallace | |
| D286,369 S | 10/1986 | Hahn | |
| 4,664,365 A | 5/1987 | Heine | |
| 4,736,927 A | 4/1988 | Clancy | |
| 4,738,438 A | 4/1988 | Horie et al. | |
| 4,739,838 A | 4/1988 | Marks | |
| 4,770,401 A | 9/1988 | Donaldson | |
| 4,773,636 A | 9/1988 | Takahashi | |
| 4,850,254 A | 7/1989 | Burney | |
| 4,874,155 A | 10/1989 | Goul | |
| 4,893,801 A | 1/1990 | Flinn | |
| 4,926,722 A | 5/1990 | Sorensen et al. | |
| 4,989,847 A | 2/1991 | Chapman | |
| 5,005,449 A | 4/1991 | Sorensen et al. | |
| 5,009,134 A | 4/1991 | Sorensen et al. | |
| 5,022,137 A | 6/1991 | Sorensen et al. | |
| D320,919 S | 10/1991 | Sorensen | |
| 5,094,131 A | 3/1992 | Sorensen et al. | |
| 5,096,170 A | 3/1992 | Albin | |
| 5,110,100 A | 5/1992 | Cotton | |
| D328,846 S | 8/1992 | Sorensen et al. | |
| 5,156,508 A | 10/1992 | Grisley | |
| 5,161,787 A | 11/1992 | Hobday | |
| 5,170,682 A | 12/1992 | Sorensen et al. | |
| D333,602 S | 3/1993 | Gatzemeyer et al. | |
| D333,963 S | 3/1993 | Goodman | |
| 5,197,360 A | 3/1993 | Wooster, Jr. | |
| 5,217,213 A | 6/1993 | Lii | |
| 5,222,420 A | 6/1993 | Sorensen et al. | |
| D340,632 S | 10/1993 | Easley | |
| D340,851 S | 11/1993 | Sorensen | |
| D341,069 S | 11/1993 | Sorensen | |
| D346,942 S | 5/1994 | Sawdon | |
| 5,326,076 A | 7/1994 | Sorensen et al. | |
| 5,346,194 A | 9/1994 | Coffin, III | |
| D355,104 S | 2/1995 | Sorensen et al. | |
| D357,165 S | 4/1995 | Sorensen et al. | |
| 5,443,246 A | 8/1995 | Peterson | |
| 5,454,551 A | 10/1995 | Hobday | |
| D365,263 S | 12/1995 | Sorensen et al. | |
| D366,819 S | 2/1996 | Wooster, Jr. et al. | |
| D366,820 S | 2/1996 | Wooster, Jr. et al. | |
| 5,584,458 A | 12/1996 | Rando | |
| 5,593,147 A | 1/1997 | Read | |
| 5,664,817 A | 9/1997 | Ballew et al. | |
| 5,666,964 A | 9/1997 | Meilus | |
| 5,692,734 A | 12/1997 | Aldredge, Sr. | |
| 5,775,680 A | 7/1998 | Sorensen et al. | |
| 5,826,310 A | 10/1998 | Hobday | |
| 5,853,168 A | 12/1998 | Drake | |
| 5,988,616 A | 11/1999 | Fuller et al. | |
| D417,377 S | 12/1999 | Blank et al. | |
| 6,029,964 A | 2/2000 | Bohl | |
| 6,050,559 A | 4/2000 | de Souza | |
| 6,089,556 A | 7/2000 | Whiteford | |
| 6,254,073 B1 | 7/2001 | Noniewicz et al. | |
| 6,302,386 B1 | 10/2001 | Fuller et al. | |
| 6,338,475 B1 | 1/2002 | Ping | |
| 6,340,154 B1 | 1/2002 | Young | |
| 6,347,791 B1 | 2/2002 | Chervenak | |
| 6,367,787 B1 | 4/2002 | Poole et al. | |
| 6,412,767 B1 | 7/2002 | Beckmann et al. | |
| 6,438,854 B1 | 8/2002 | Kott, Jr. | |
| 6,450,489 B1 | 9/2002 | Wang | |
| 6,474,632 B1 | 11/2002 | Liou | |
| 6,568,667 B1 | 5/2003 | Hall | |
| 6,578,837 B1 | 6/2003 | Blank et al. | |
| 6,585,243 B1 | 7/2003 | Li | |
| 6,641,122 B2 | 11/2003 | Roesch | |
| 6,648,314 B1 | 11/2003 | Degen et al. | |
| 6,648,315 B1 | 11/2003 | Lee | |
| 6,655,670 B1 | 12/2003 | Liou | |
| 6,676,120 B1 | 1/2004 | Hallbeck et al. | |
| 6,685,176 B2 | 2/2004 | Wirth, Jr. et al. | |
| 6,758,098 B1 | 7/2004 | Nunnelee | |
| D494,282 S | 8/2004 | Sperbeck | |
| D500,238 S | 12/2004 | Varzino | |
| 6,860,179 B2 | 3/2005 | Hopper et al. | |
| 6,883,795 B2 | 4/2005 | McCormick et al. | |
| 6,957,808 B2 | 10/2005 | Varzino et al. | |
| 6,971,641 B1 | 12/2005 | Sherwin | |
| 7,066,457 B2 | 6/2006 | Gerritsen et al. | |
| 7,090,209 B1 | 8/2006 | Rowlay | |
| 7,131,642 B1 | 11/2006 | Rowlay et al. | |
| 7,293,765 B2 | 11/2007 | Hooper | |
| 7,389,978 B2 | 6/2008 | Rowlay et al. | |
| 7,604,224 B2 | 10/2009 | Rowlay et al. | |
| 7,651,078 B2 * | 1/2010 | Geier et al. | 269/6 |
| 7,735,813 B2 * | 6/2010 | Geier et al. | 269/6 |
| 2002/0070425 A1 | 6/2002 | Klimach et al. | |
| 2003/0030205 A1 | 2/2003 | Klimach et al. | |
| 2003/0075850 A1 | 4/2003 | Wirth et al. | |
| 2003/0090048 A1 | 5/2003 | Varzino et al. | |
| 2003/0141644 A1 | 7/2003 | Thomas | |
| 2004/0113344 A1 | 6/2004 | Wirth et al. | |
| 2004/0140602 A1 | 7/2004 | Gerritsen et al. | |
| 2004/0195746 A1 | 10/2004 | Marks | |
| 2005/0082728 A1 | 4/2005 | Cicenas et al. | |
| 2005/0121842 A1 | 6/2005 | Lo | |
| 2006/0091596 A1 | 5/2006 | Marusiak | |
| 2007/0069438 A1 | 3/2007 | Rowlay et al. | |
| 2007/0176342 A1 | 8/2007 | Noniewicz | |

| | | | |
|---|---|---|---|
| 2007/0194510 | A1 | 8/2007 | Geler et al. |
| 2008/0048374 | A1 | 2/2008 | Geier et al. |
| 2008/0053262 | A1* | 3/2008 | Geier et al. .............. 74/473.15 |
| 2008/0157450 | A1 | 7/2008 | Marusiak |
| 2008/0290575 | A1* | 11/2008 | Geier et al. ................ 269/170 |
| 2010/0276860 | A1* | 11/2010 | Geier et al. ............ 269/254 CS |

FOREIGN PATENT DOCUMENTS

| | | |
|---|---|---|
| DE | 9114009 | 4/1992 |
| FR | 2611160 | 8/1988 |
| GB | 605076 | 7/1948 |
| GB | 2375984 | 12/2002 |
| TW | 54742 | 7/1994 |
| WO | WO-9513165 A1 | 5/1995 |
| WO | WO-0214020 A1 | 2/2002 |
| WO | WO-2005011918 A2 | 2/2005 |
| WO | WO-2005087438 A2 | 9/2005 |

OTHER PUBLICATIONS

Advertisement for Bessey Bar Clamps Styles 52, 53 and 56. Publication source and date unknown. It is believed that this publication was available to the public prior to Jul. 15, 1993.

Advertisement for Gross Stabil Clamp. Publication source and date unknown. It is believed that this publication was available to the public prior to Jul. 15, 1993.

Bessey Steel Bar Clamp Fixture RS 75 instructions. Publication source and date unknown. It is believed that this publication was available to the public prior to Jul. 15, 1993.

"Catalog—American Tool Companies, Inc." advertisement of American Tool Companies, Inc., pp. 2-1 through 2-3 and 2-5 through 2-6. It is believed that the catalog was published in Oct. 1997.

Copending U.S. Appl. No. 11/928,057, filed Oct. 10, 2007.

Copending U.S. Appl. No. 10/567,091, filed Apr. 11, 2006.

PCT International Search Report for PCT/US2005/039711 dated Jun. 16, 2006.

PCT Written Opinion of the International Searching Authority for PCT/US2005/039711 dated Jun. 16, 2006.

"Pony Clamp Fixtures" styles 50, 52, 53 and 56. "Jorgensen style 3500 Aluminum Bar Clamps." "Jorgensen Style 7200 Steel I-Bar Clamps." Publication source and date unknown. It is believed that this publication was available to the public prior to Jul. 15, 1993.

"Pony Steel Bar Clamp Fixtures" styles 50, 52 and 56. Publication source and date unknown. It is believed that this publication was available to the public prior to Jul. 15, 1993.

* cited by examiner

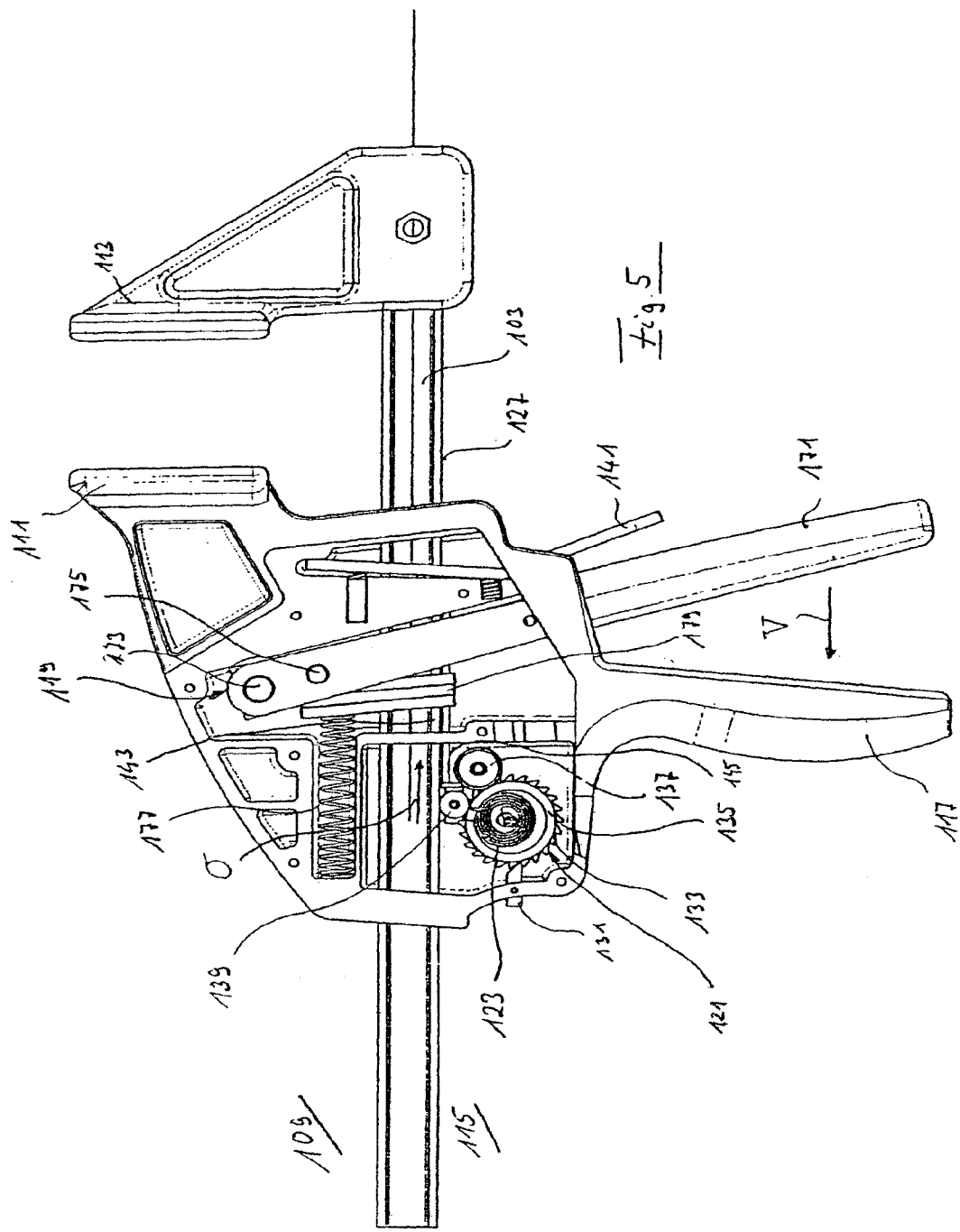

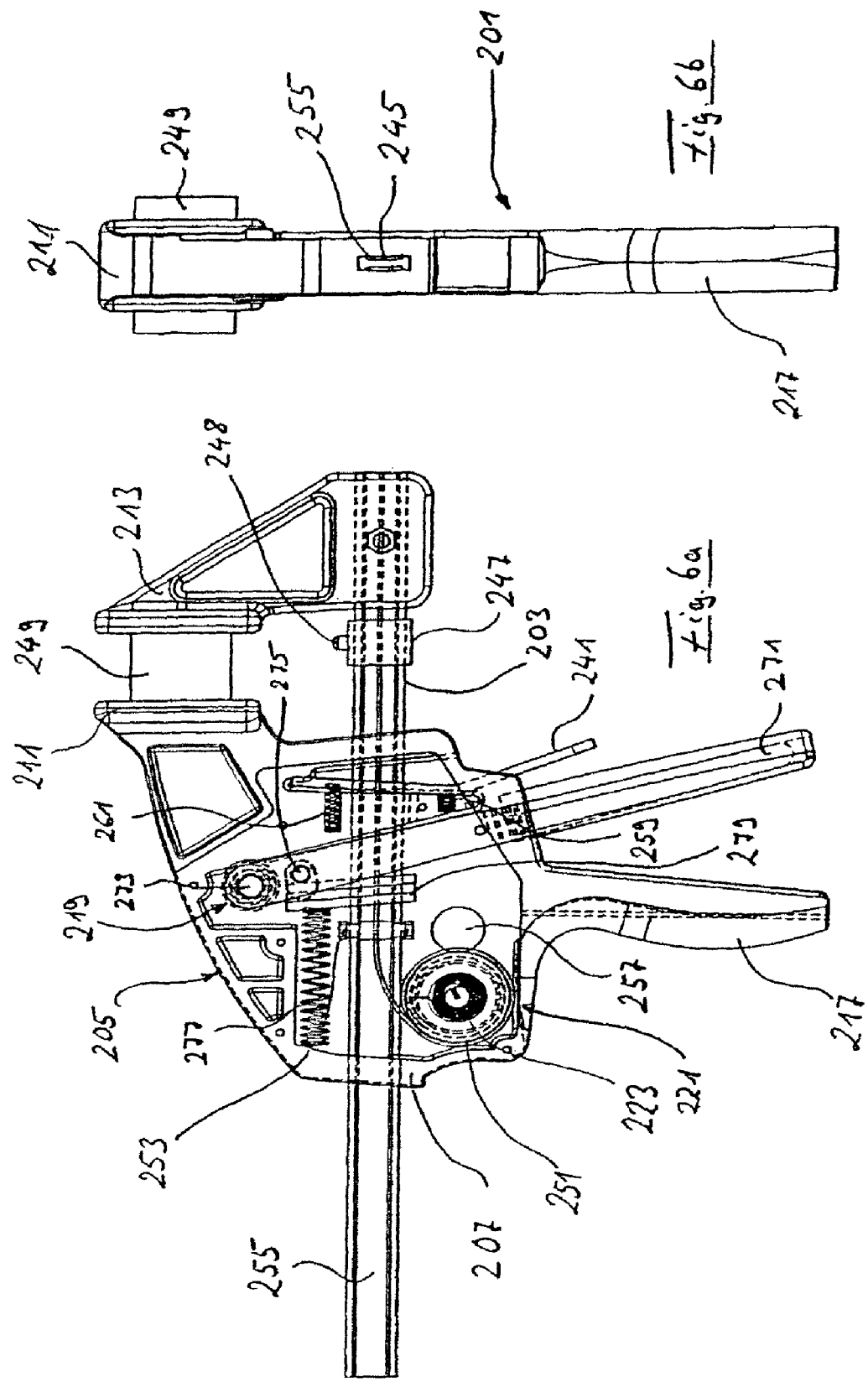

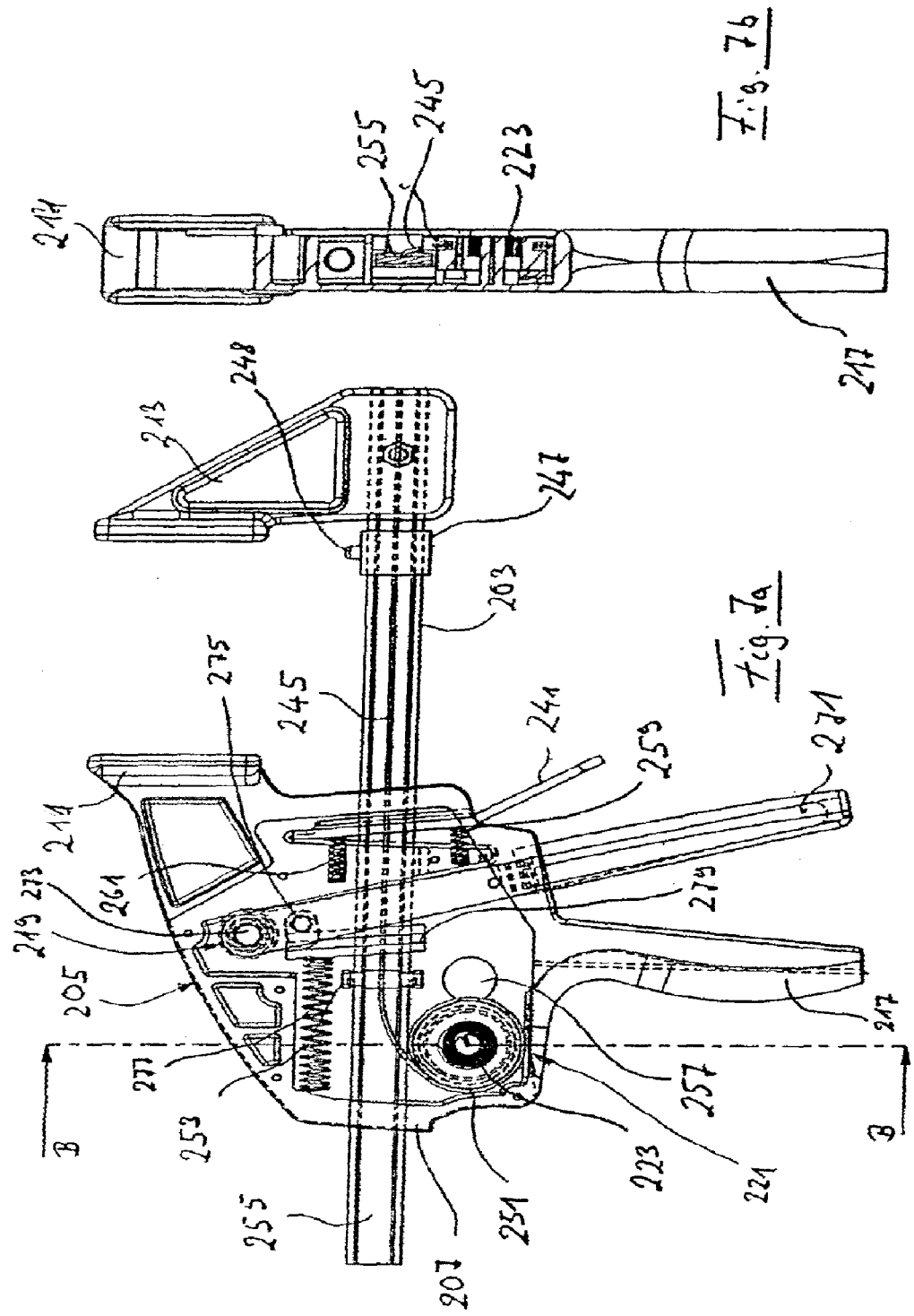

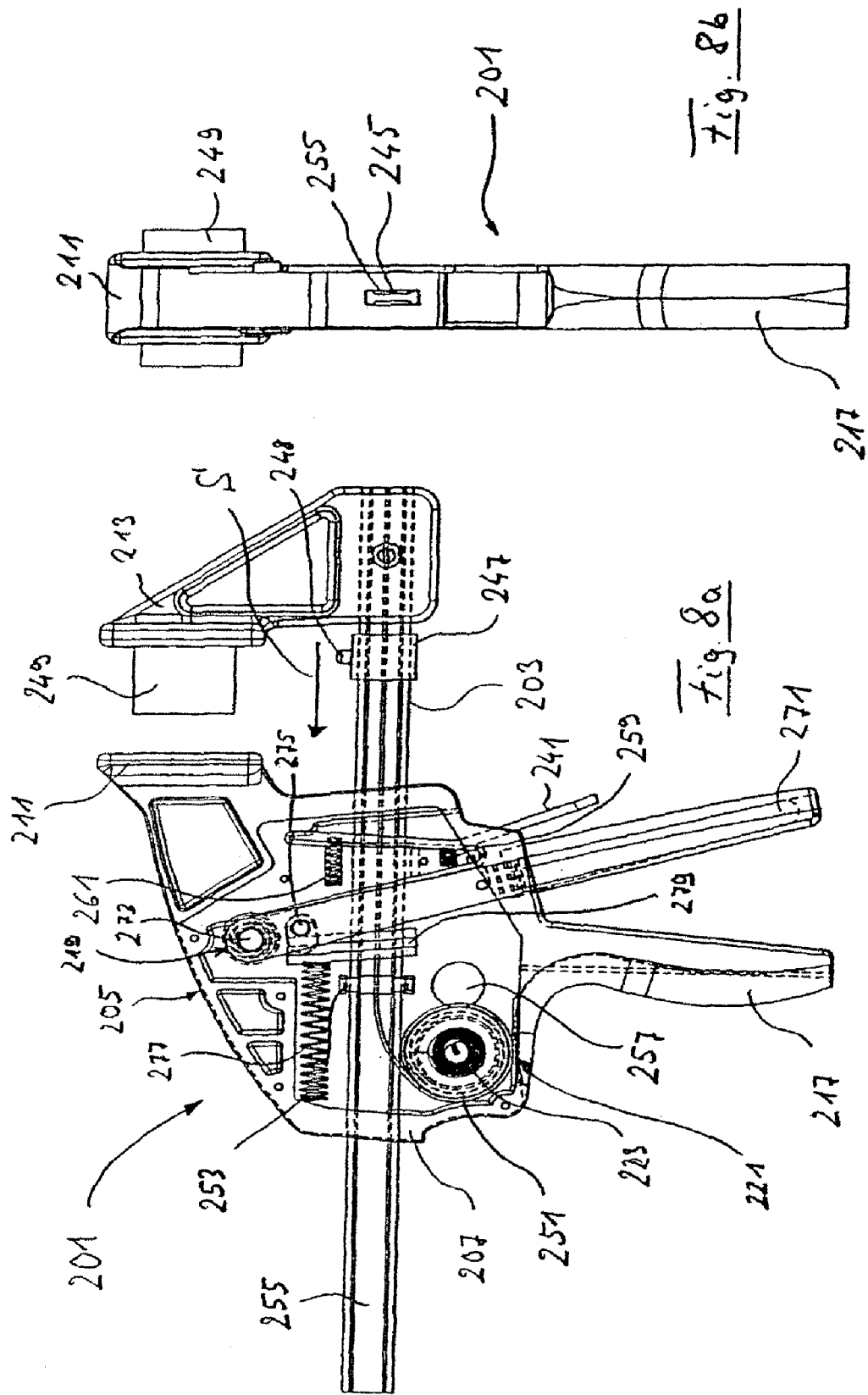

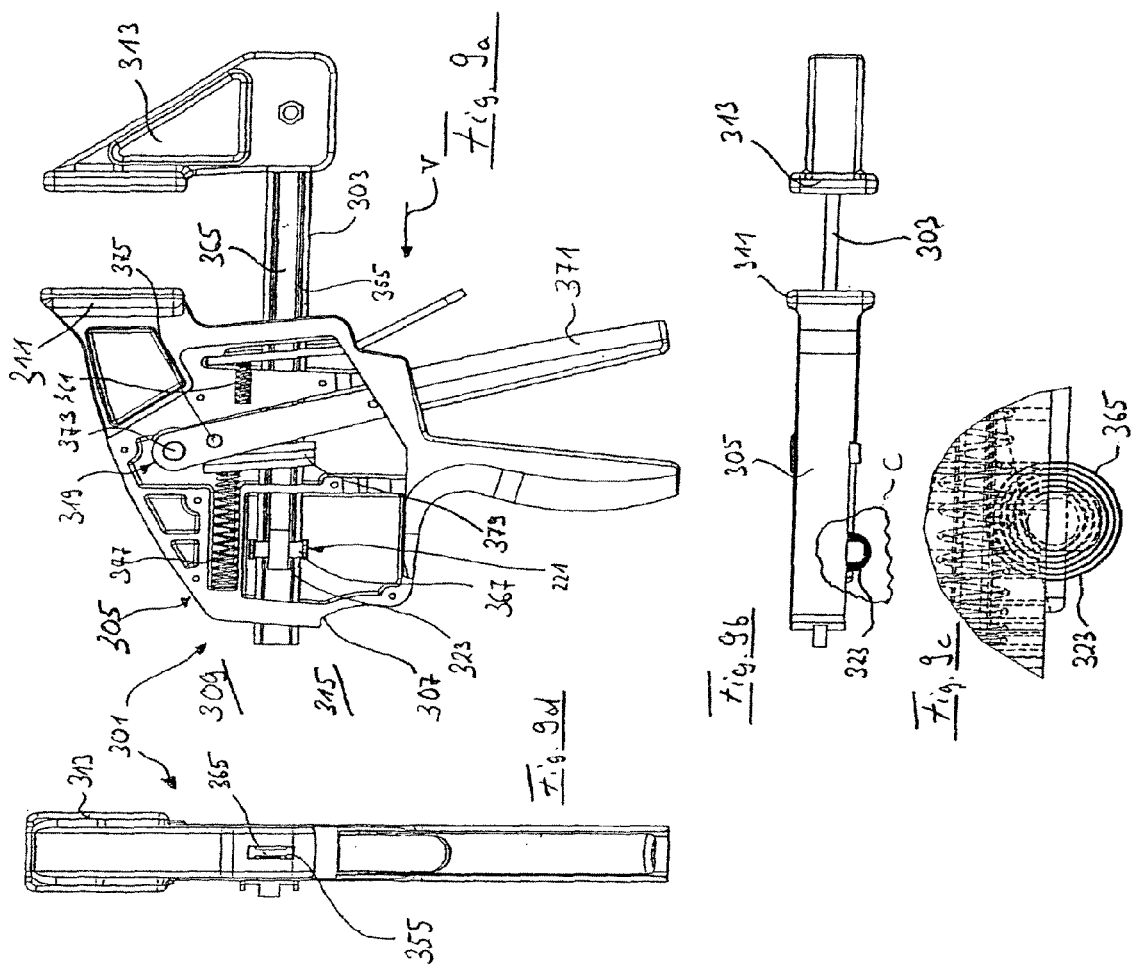

CLAMPING OR SPREADING TOOL

RELATED APPLICATIONS

This application is a continuation of and claims priority from U.S. patent application Ser. No. 11/936,439, filed on Nov. 7, 2007, which is a continuation of and claims priority benefit from U.S. patent application Ser. No. 10/576,091, filed on Apr. 11, 2006, which is a U.S. national phase of PCT EP/2004/014179 filed on Dec. 13, 2004, which claims priority benefit of: DE 103 58 301.7 filed on Dec. 12, 2003; DE 103 58 296.7 filed on Dec. 12, 2003; DE 103 58 302.5 filed Dec. 12, 2003; DE 103 58 303.3 filed Dec. 12, 2003; DE 103 58 304.1 filed Dec. 12, 2003; and DE 103 58 291.6 filed Dec. 12, 2003, the specifications of which are hereby incorporated by reference.

BACKGROUND

1. Field of the Invention

The invention relates to a clamping and/or spreading tool comprising a drive for displacement of a push or pull rod to which a movable jaw is fixed with respect to a support carrying a stationary jaw, in longitudinal direction of the push or pull rod.

2. Description of the Related Art

It is known to provide in particular clamping and/or spreading tools with a stepping gear transmission to cause stepwise approach of the movable jaw to the stationary jaw and, at the same time, apply the clamping forces required between the clamping jaws. Such a clamping and/or spreading tool is known from DE 39 17 473 which comprises a stepping gear transmission of which the step width per actuating stroke of a drive arm is sufficiently great and a relatively small actuating force can give rise to clamping forces when clamping an article which is grasped between the jaws. A clamping and/or spreading tool of this kind has proved very successful in everyday use.

U.S. Pat. No. 6,568,667 discloses a clamping and/or spreading tool comprising an identical stepping gear transmission and an additional quick-lock drive which operates to close the clamping jaws, i.e. to shift the movable jaw towards the stationary jaw when a draw-back lock preventing displacement of the push or pull rod contrary to the advance direction of the stepping gear transmission is actuated. The prime mover of the quick-lock drive is embodied by a helical compression spring acting between points of attachment at a side of the support remote from the movable jaw. It is a disadvantage of this quick-lock mechanism that much space is required to offer the quick-lock mechanism the path needed for unfolding the driving power stored. As the compression spring assembly needs a long drive path for the driving power to unfold, clamping and/or spreading tools of this kind have not only a great axial extension but also great weight, making such tools unwieldy to handle. Moreover, nonlinear power output accompanies the helical compression spring, in other words great thrust occurs at the beginning of the closing motion, diminishing gradually in the course of the closing motion. Above all, the known drive bears a risk of injury since the movable jaw closes explosively.

SUMMARY

It is an object of the invention to overcome the disadvantages of the state of the art, providing especially a drive for a clamping and/or spreading tool for especially continuous displacement of a push or pull rod, the dimensions in space of the clamping and/or spreading tool being small and the weight lower, and especially uniform closing motion with especially a uniform closing force being warranted.

A drive wheel adapted to be driven in rotation is provided for cooperation with the push or pull rod. As this rotatable drive wheel does not need a drive or acceleration path extending in longitudinal direction of the push or pull rod, the axial dimension of the clamping and/or spreading tool according to the invention is clearly reduced in comparison with known clamping and/or spreading tools having a corresponding mode of operation. Not only the weight is reduced as a consequence of the small dimensions but also the handling of the clamping and/or spreading tool is facilitated since its actuation, especially that of a stepping gear transmission is not obstructed by portions of the push or pull rod projecting far beyond the support. Especially when space is tight where a clamping or spreading tool is to be used and a handle of the stepping gear transmission is restricted, the clamping and/or spreading tool according to the invention is much easier to manipulate than the known ones. While the known high speed closure mechanism including a compression spring presents further risk of injury to the operator in that he/she may get parts of his/her body squeezed between the coil windings and the propelling forces are released explosively, such potential risks can be eliminated by the measure according to the invention. According to the invention, the drive wheel is operationally coupled to a torsion spring for rotational driving. The torsion spring is a mechanical prime mover having a mechanical energy reservoir. In comparison with an electrical alternative, this mechanical prime mover has the advantage of not being dependent on electrical power supply. The wheel driven by the torsion spring, according to the invention, is adapted to enter into torque transmitting engagement with the push or pull rod to displace the same. The drive wheel can be engaged with the push or pull rod to transmit torque.

Preferably, the drive wheel is arranged directly in contact with the push or pull rod, especially for engagement in friction or force lock whereby the drive wheel rolls off the push or pull rod so as to transmit the torque. The drive wheel is coordinated with the push or pull rod in such a way that, operationally, the rotary motion of the drive wheel can be converted into translatory motion for the push or pull rod. With the gear member thus designed as a drive wheel, the motor may be embodied by a torsion spring having especially only a single rotary driving direction. A suitable gear arrangement must be interposed between the torsion spring and the structural element which converts the rotational movement into translatory movement so as to guarantee displacement of the push or pull rod in both longitudinal directions. When using an electric motor, displacement of the push or pull rod in both longitudinal directions can be accomplished simply by reversing the direction of rotation through reversal of polarity of the electric motor. The drive wheel preferably rolls off the push or pull rod such that the push or pull rod is shifted in substantially rotation-free movement, i.e. pure translatory movement.

In a preferred design of the drive according to the invention as a torsion spring motor, a mechanism is provided for changing the direction of displacement of the push or pull rod. The change may occur as a change from closing displacement to opening displacement and/or vice versa. The mechanism preferably comprises a rotation alternator designed to invert the torque transmitted to the push or pull rod by the drive wheel.

With a special design of the rotation alternator, a gear component for converting rotary motion into preferably purely translatory motion is disposed between the drive wheel and the push or pull rod. The rotatable gear component is adapted for an engagement with the drive wheel in which torque is transmittable, and to be disengaged from the same. With the gearing configured for torque transmitting engagement, the push or pull rod can be displaced in one direction, whereas the opposite direction of displacement is offered when the gear component is in a position in which engagement with the gear member is lifted. The gear component can be changed manually by the operator from an active position for converting rotary motion into translatory motion into a passive position without conversion of rotary motion.

A special design of the mechanism for reversing the direction of displacement comprises an intermediate gear member which is adapted to be coupled operationally with the drive wheel and the gear component. This coupling is mutually exclusive. For instance, with a first configuration of the gearing for a first direction of displacement, the drive wheel drives the gear component through the intermediate gear member. With a second gearing configuration, the drive wheel drives the gear component directly, without intermission of the gear member.

The intermediate gear member is adapted to enter into form- or force-lock engagement, especially rolling-off engagement with the drive wheel and/or the gear component. That may be accomplished by frictional contact or by a meshing teeth connection.

In a further development of the invention, the mechanism for reversing the direction of displacement is provided with a switch means for selecting the direction of displacement, especially a switch means which can be actuated manually by the person handling the clamping and/or spreading tool. The switch means especially may be provided in the form of an operating member or actuator by which to activate and/or deactivate the rotation alternator.

Especially in a clamping and/or spreading tool of known structure comprising a stepping gear transmission and a draw-back lock to prevent displacement of the push or pull rod contrary to the advance direction of the stepping gear transmission according to the invention, the draw-back lock may be drawn upon to serve as an operating member or actuator of the switch means.

The operating member or actuator comprises an especially non-actuated position to prevent displacement of the push or pull rod in closing and/or opening direction. If the actuator is embodied by the draw-back lock of a stepping gear transmission the blocking position is a non-actuated position of the draw-back lock. On the one hand, shifting of the push or pull rod is blocked functionally against the advance direction of the stepping gear transmission, i.e. for opening the clamping jaws.

The actuator may have a first release position to permit rotational movement for a first direction of displacement. Especially with the draw-back lock serving as actuator, this first release position may be obtained by lightly actuating the lever of the draw-back lock especially into an intermediate position at which the blocking function is cancelled and the push or pull rod may be shifted contrary to the advance direction of the stepping gear transmission.

The actuator, moreover, may have a second release position, especially an end or stop position, to permit rotational movement for a second direction of displacement. Especially with the draw-back lock serving as actuator, this second release position may be obtained by fully actuating or pressing down the lever of the draw-back lock, i.e. up to the stop. Hereby, for instance, the above mentioned rotation alternator can be activated, thus allowing the push or pull rod to be shifted in opposite sense to the first direction of displacement, for example, for opening the clamping jaws.

An adjusting member may be provided especially with a mechanism for reversing the direction of displacement and comprising a gear component and an intermediate gear member, to either adjust the gear component or the intermediate gear member so that one of the two will establish or break form-lock or force-lock, especially roll-off engagement with the drive wheel.

Another aspect of the invention, dependent on or independent of the above mentioned subject matter of the invention, relates to a clamping and/or spreading tool with which the ergonomics of the clamping and/or spreading tool are to be improved, especially a drive for a clamping or spreading tool for especially continuous displacement of the push or pull rod is to be provided, the dimensions in space, especially in longitudinal direction, and the weight are minimized, and uniform closing motion with especially uniform closing force is offered.

According to the invention a means is provided for generating pull between the push rod and the pull rod and the support. The dimension of the support and its casing can be utilized by the measure of the invention to make use of a drive path for releasing drive energy. Alternative drive paths are not needed, as with the known quick-lock mechanism. Therefore, the clamping or spreading tool according to the invention has much smaller dimensions and also substantially lower weight. Moreover, pulling means in general release the driving force less abruptly because of their elasticity, whereby the risk of injury is reduced.

In the case of a preferred design, the small space requirement is due, above all, to a tension spring, especially a torsion spring. The tension spring has points of application of force both at the support and at the push or pull rod or at the movable jaw.

To permit holding especially large articles between the clamping jaws, the tension spring is releasably attached to the push or pull rod or to the movable jaw so as to be readjustable to a position closer to the support and secured once more. In this manner tension springs of short pulling distances may be drawn upon.

In a preferred design, the means for generating pull, especially a torsion spring, is coupled to a force transmitting member which is adapted to be wound up. The free end of the coilable force transmitting member, such as a winding strand, is firmly connected to the push or pull rod or to the movable jaw. The torsion spring winds up the winding strand on a winding bobbin as the movable jaw is pulled to close.

With a preferred design of the invention, a coil carrier, the above mentioned winding bobbin, is coupled in power transmitting fashion to the means for generating pull. The coil carrier especially is supported stationarily on the support.

With a preferred design of the invention, the means for generating pull is a coiled spiral band spring. The spiral band spring is characterized by uniform, linear power output regardless of the degree of unwinding. The spiral band spring may comprise a spiral band carrier which is supported for rotation on the support.

With a further development of the invention, the push or pull rod is provided with a seat for an unwound band section of the spiral band spring. The depth of the seat is such that the unwound spiral band can lie with clearance between the push or pull rod and the support. In unwound condition, the stored tension drive energy is stored in the spiral band spring.

With a preferred design of the invention, the drive according to the invention is provided with a stepping gear transmission which generates small displacement distances and, therefore, can apply great clamping forces between the clamping jaws. The stepping gear transmission is associated with a drive which is independent of the means for generating pull and is actuated by an operator who actuates a drive arm. The drive arm is designed so as to be engageable, in accordance with leverage transmission, with the push or pull rod through an entraining element which is shiftable against a return spring and to be pivoted on a clamping side of the push or pull rod which side faces the jaws.

The drive according to the invention for quick locking of the movable jaw in combination with the stepping gear transmission indeed presents a one-hand vise by which rapid gripping by means of the quick-lock mechanism as well as application of great clamping forces at little power input can be realized.

The drive arm of the stepping gear transmission comprises a swivel bearing disposed in the course of the longitudinal direction of the push or pull rod substantially at the level of the entraining element, the drive arm especially having a permanent, stationary swivel bearing point. The swivel bearing and a force input location of the drive arm in the entraining element are essentially located in a plane with respect to which the push or pull rod extends as a normal. The drive arm especially comprises a first portion, including an active crank which is defined by the distance of the swivel bearing from the force input location and further comprises a second portion at which an operator actuates the drive arm. The stepping gear transmission especially includes a return spring designed to move the drive arm from its actuating positions into an output position upon release of an actuating force, the drive arm being actuatable for a complete actuating stroke in said location. Furthermore, the stepping gear transmission comprises permanent canting of the entraining element, at which canting especially a return spring acts upon the entraining element in such a way that the entraining element abuts in canting fashion on the push or pull rod, being urged against a stop on the drive arm, when the drive arm is in the non-actuated operating state.

A means for releasing the permanent canting of the entraining element can be provided as well. The means for releasing the canting of an entraining element is operable through a stop which prevents shifting of the push or pull rod in opposite sense to the advance direction of the stepping gear transmission.

Depending or not on the subject matters of the invention mentioned above, the invention also relates to a clamping and/or spreading tool of which the ergonomics are to be improved and, especially, an operationally reliable and simple handle is guaranteed. Any impairing of the article to be clamped by forces acting from the drive on the article is to be excluded as best as possible.

According to the invention a means for damping power output by the prime mover for displacing the push or pull rod is provided at any point of the displacement distance of the push or pull rod on the prime mover. The damping means which is adapted to weaken the driving power to be output by the prime mover especially can provide uniform displacement of the movable jaw, the displacing rate being adjustable for simple dosing and smooth gripping of the article to be clamped. Moreover, the arrangement according to the invention comprising the prime mover and the damping means can minimize the risk of injury at the handle of the clamping and/or spreading tool.

The ergonomics of the clamping and/or spreading tool is rendered especially simple and advantageous if the rate of shifting is the same at every point of the displacement distance. Such uniform speed during displacement can be achieved by having the damping means tuned specifically to the prime mover to be housed in the clamping and/or spreading tool. When a helical compression spring is used the spring rates can be determined in response to the spring excursion so that a damping means adjusted accordingly can be coordinated with the helical compression spring.

In a particular design of the invention, the damping means and the prime mover are combined in a single structural unit, especially a single component. For instance, such a component might consist of torsion spring types, especially a spiral band spring, adapted to output a uniform propelling force irrespective of the spring excursion. While the elastic deformability of the torsion spring upon clamping, i.e. during unwinding of the torsion spring provides useful power to recover the formerly wound-up original configuration, the material deformation and rotational friction of the torsion spring about its support base contribute the damping function.

In a special further development of the invention the damping means is embodied by a piston and cylinder arrangement including a damping fluid. The piston of the damping means may be secured to the push or pull rod, while the cylinder of the damping means is stationarily associated with the support.

In a preferred design of the invention, the damping means acts on a rotatable gear member. The gear member may be designed to be a damping member adapted to be driven in rotation and working in damping fashion, especially splashing about in a damping fluid, especially a damping liquid contained in a casing.

The damping means may achieve its damping characteristic by generating friction loss. It may also be proposed according to the invention that the damping means should produce splashing loss.

Another aspect of the invention, dependent on or independent of the subject matters of the invention mentioned above, relates to a clamping and/or spreading tool with which sufficient drive energy for carrying out displacements of the push or pull rod is always at the operating person's disposal, no matter what the operation configuration of the clamping and/or spreading tool.

According to the invention a mechanism is provided for loading drive energy, the mechanism being chargeable independently of the displacement operation of the push or pull rod. If an operator needs drive energy when the drive energy reservoir is empty because the helical compression spring is relaxed already, the measure according to the invention can put fresh drive energy at the disposal of the drive without changing the position of the movable jaw with respect to the stationary jaw, in other words without having to alter the operating state of the clamping and/or spreading tool. Thus the functional flexibility of the clamping and/or spreading tool is greatly enhanced for the operator. Charging, for instance, may be done prior to use of the clamping and/or spreading tool and then be utilized in the individual case. Moreover, according to the invention a torsion spring is provided as the drive, and this spring itself presents the reservoir of drive energy. The energy reservoir is loaded when the torsion spring is tightened. The torsion spring is especially well suited as a reservoir for drive energy because the torsion spring can output its propelling force in the form of rotary motion, not requiring translatory motion which would entail considerable demand for space, as is the case with the known clamping and/or spreading tool according to U.S. Pat. No. 6,568,667.

The torsion spring may be locked for automatic release of its drive energy, being supported so as to be rotatable against the driving direction of rotation for charging by an operating member or an interlocking clinch arrangement. The means for locking the distribution of drive energy may be a latch means. The torsion spring may be turned manually from outside by the operator through the actuator means, thereby becoming charged.

The actuator means also may be designed such that it may cause release of the locking means in addition to the manual charging movement.

Yet another dependent or independent aspect of the invention relates to a clamping and/or spreading tool with which ergonomics are to be improved, especially the functioning for the single handed possibility of actuating the clamping and/or spreading tool is broadened, and drive energy is made available at almost any operating position of the clamping and/or spreading tool.

According to the invention, a mechanism is designed to load drive energy into the reservoir not only when the push or pull rod is displaced in closing direction—the closing direction being understood to be the direction in which the movable jaw moves towards the stationary jaw when the clamping configuration of the clamping and/or spreading tool is given, and the closing direction also being understood to be the direction in which the movable jaw is moved away from the stationary jaw when the spreading configuration of the clamping and/or spreading tool is given—but also when it is displaced in opening direction opposite to the closing direction.

The measure according to the invention makes sure that the operator has drive energy available not only when the movable clamping jaw is in open position opposite the stationary jaw but also when it abuts against the stationary jaw. Making available drive energy no matter what the operating position and configuration of the clamping and/or spreading tool renders the clamping and/or spreading tool actuatable by one hand, both for gripping the article to be clamped and for applying great clamping forces to the article to be clamped and also for releasing the clamped article and opening and freeing the clamped article as well as bringing the movable jaw into a starting position in which the clamping and/or spreading tool is ready for renewed use, especially for clamping another article.

Moreover, the measure according to the invention permits drive energy to be made available not only for a quick-lock mechanism but also for a rapid opening mechanism of the clamping jaws. If different drives are being used for the two different directions of displacement the loading mechanism may be designed so that a reservoir for the first drive is loaded with energy as the clamping jaws are being closed, while a reservoir for the other drive is loaded with energy as the clamping jaws are being opened.

In a preferred and/or independent design of the invention the loading mechanism comprises a gear member driven in rotation. The gear member receives the required torque for the charging process, for example, by establishing friction or form-lock contact, especially roll-off contact between the push or pull rod and the gear member. The gear member is coupled to a torsion spring in such manner that the rotational movement of the gear member tensions the prime mover. Where the prime mover is embodied by a torsion spring the reservoir for drive energy and a means for converting rotary motion of the gear member into drive energy are integrated in one aggregate.

With a preferred design only one prime mover, especially in the form of a torsion spring is provided for propulsion in both directions of displacement. To assure the charging procedure by the loading mechanism in both directions of displacement, a rotation alternator is provided in a further development of the invention. It changes the rotational movement of the gear member, upon reversal of the direction of displacement of the push or pull rod, into a rotational charging movement which is required by the means for converting the rotational movement. That can be accomplished, for instance, by the provision of an intermediate gear member between the rotatable gear member and the push or pull rod. The intermediate gear member is adapted to enter into engagement between the push or pull rod and the gear member by way of a switching mechanism, whereby the direction of rotation is inverted.

With the further development of the invention, the rotation alternator, especially the switch means is manually operable to cause the intermediate gear member to enter into engagement with the gear member.

With a preferred further development of the invention, the rotation alternator is made automatic, i.e. it is activated when the direction of displacement of the push or pull rod is changed, for example, by subjecting the push or pull rod to external pressure or tension.

A further development of the loading mechanism according to the invention provides blocking of the energy release. The blocking is activated during the charging process so that the drive energy introduced into the reservoir will not be passed out but rather be releasable by the operator at the time the drive energy is required.

The energy release blocking preferably may be undone manually by the operator.

A specific design of the energy release blocking is provided with a locking pawl means or a clinch locking arrangement which blocks the drive motion of a torsion spring and, especially, may engage the gear member or the torsion spring.

BRIEF DESCRIPTION OF THE DRAWINGS

Further advantages, features, and properties of the invention will become apparent from the description below of preferred designs of the invention with reference to the accompanying drawings, in which:

FIG. 5 is a side elevational view of the clamping and/or spreading tool shown in FIG. 2, showing a deactivated drive, illustrating the mechanism according to the invention for loading drive energy during opening movement of the jaws;

FIG. 6a is a side elevational view of another design according to the invention of a clamping and/or spreading tool, illustrating clamping jaws in clamping state;

FIG. 6b is a front elevational view of the clamping and/or spreading tool shown in FIG. 6a;

FIG. 7a is a side elevational view of the design according to the invention of the clamping and/or spreading tool shown in FIGS. 6a, 6b, illustrating an open clamping jaw configuration;

FIG. 7b is a cross sectional view of the clamping and/or spreading tool shown in FIG. 7a, along line B-B;

FIG. 8a is a side elevational view of the clamping and/or spreading tool shown in FIGS. 6a to 7b, illustrating an operating mode of closing the clamping jaws;

FIG. 8b is a front elevational view of the clamping and/or spreading tool shown in FIG. 8a;

FIG. 9a is a side elevational view of another design according to the invention of a clamping and/or spreading tool, with clamping jaws in open configuration;

FIG. 9b is a top plan view of the clamping and/or spreading tool shown in FIG. 9a;

FIG. 9c shows an enlarged detail of area C in FIG. 9b;

FIG. 9d is front elevational view of the clamping and/or spreading tool shown in FIG. 9a.

DETAILED DESCRIPTION

Figure 1:
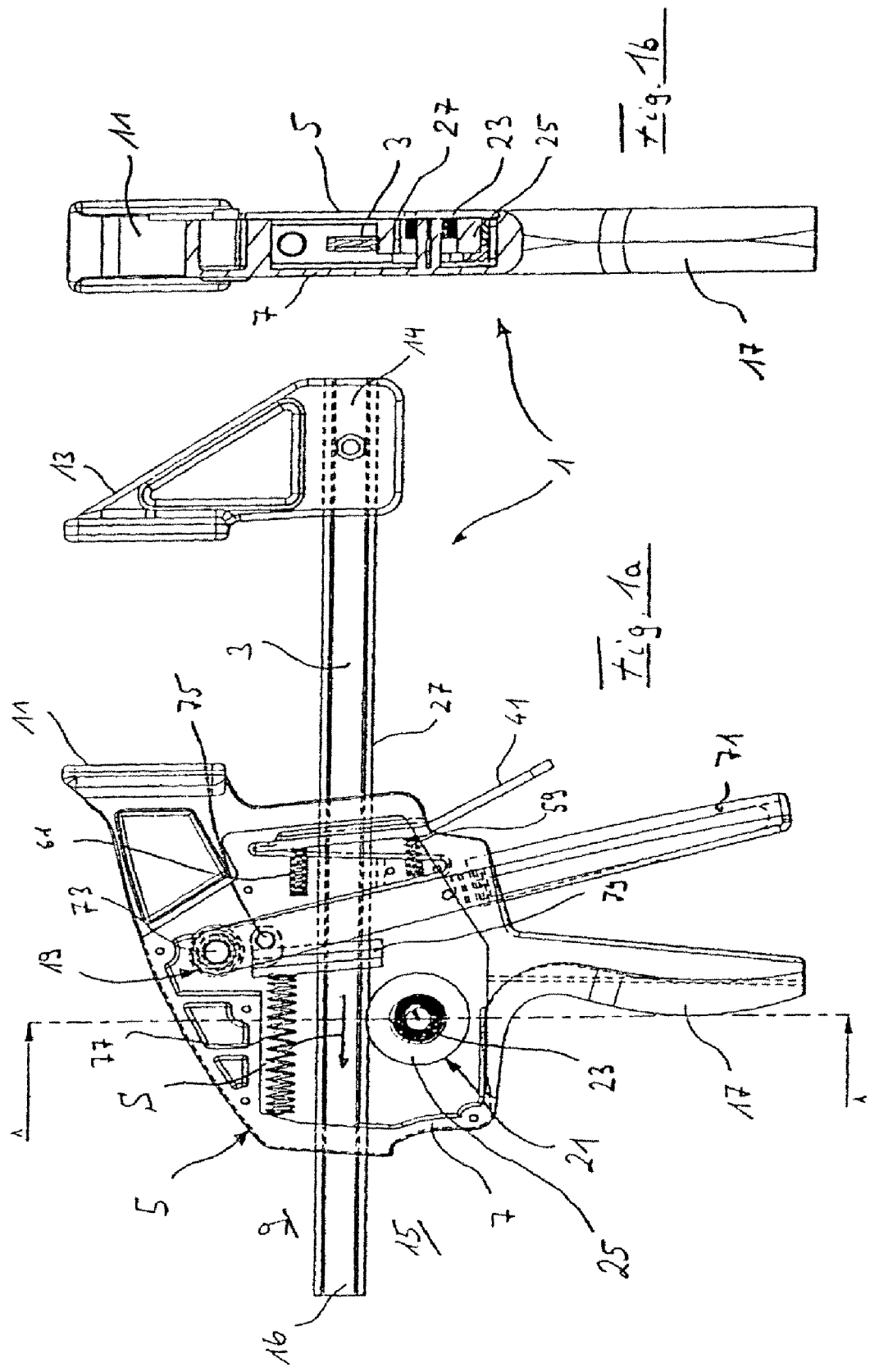
FIG. 1a is a side elevational view of a design of a clamping and/or spreading tool, with clamping jaws in open position.
FIG. 1b is a cross sectional view of the clamping and/or spreading jaw shown in FIG. 1a, along line A-A.

The preferred design of a clamping and/or spreading tool 1 illustrated in FIGS. 1a and 1b comprises a push or pull rod 3 movably supported on a support 5 for displacement in longitudinal direction of the rod. The support 5 comprises a closed casing 7, a fixed clamping jaw 11 being provided at the clamping side 9 of the push or pull rod 3, diametrically opposite a movable clamping jaw 13 which is removably attached to one end 14 of the push or pull rod 3.

FIG. 1a shows the clamping mode of the clamping and/or spreading tool 1. The clamping and/or spreading tool 1 will be in spreading mode when the movable jaw 13 is secured to the opposite end 16 of the push or pull rod 3.

At the actuating side 15 of the push or pull rod 3, opposite the clamping side 9, a handle 17 is integrally fixed to the support 5 for the clamping and/or spreading tool to be held by one hand. In addition, the support 5 carries a stepping gear transmission 19, to be explained in greater detail below. The casing 7 of the support 5 encloses and protects a drive 21 according to the invention composed of a torsion spring 23 which has an axis of rotation and a rotatably supported drive wheel 25 whose axis of rotation coincides with the axis of rotation of the torsion spring 23.

The drive wheel 25 is in power transmitting engagement with a longitudinal edge 27 of the push or pull rod 3. In FIG. 1a the torque transmitting engagement is obtained by friction lock between the drive wheel 25 and the push or pull rod 3.

The drive wheel 25 rests on the support 5 in such a way that engagement between the drive wheel 25 and the push or pull rod 3 is warranted in every position of displacement of the push or pull rod 3. The drive wheel 25 is made of a material containing rubber, and the positioning of the push or pull rod 3 with respect to the drive wheel 25 is such that bias acts between the two, generating a normal force.

With this design of a rotatable gear member in the form of a drive wheel 25 and a torsion spring 23 acting as motor and energy reservoir, a driving force attempting to close the clamping jaws 11, 13 is imparted to the push or pull rod 3 in each of its displacement positions, in other words a driving force for moving the push or pull rod 3 from right to left, as indicated by arrow S (indicating closing direction) in FIG. 1a.

The constant engagement between the drive wheel 25 and the push or pull rod 3, moreover, assures that the torsion spring 23 will be tensioned when the clamping jaw 13 carries out an opening movement, i.e. when the push or pull rod 3 moves from left to right. Thus potential energy sufficient for the subsequent opening procedure will be available for renewed opening of the clamping and/or spreading tool 1.

Use of a torsion spring 23 as a prime mover is advantageous in that it makes sure there is substantially continuous provision of torque so that continuous closing operation is offered at uniform closing force and closing speed.

The frictional force needed for torque transmission from the drive wheel 25 to the push or pull rod 3 is to be adjusted, especially by the choice of a high coefficient of friction, so that a standstill of the push or pull rod 3 will not cause the drive wheel 25 to spin. In this way it is assured that the potential energy of the torsion spring 23 will not be set free by itself because of slippage of the drive wheel 25.

The clamping and/or spreading tool described with reference to FIGS. 1a and 1b explicitly does not include a mechanism for charging an energy reservoir as the movable clamping jaw closes, nevertheless it is to be made clear hereby that the mechanism according to the invention for charging the energy reservoir upon closing of the clamping and/or spreading tool may be combined with the above designed clamping and/or spreading tools.

Figure 2:
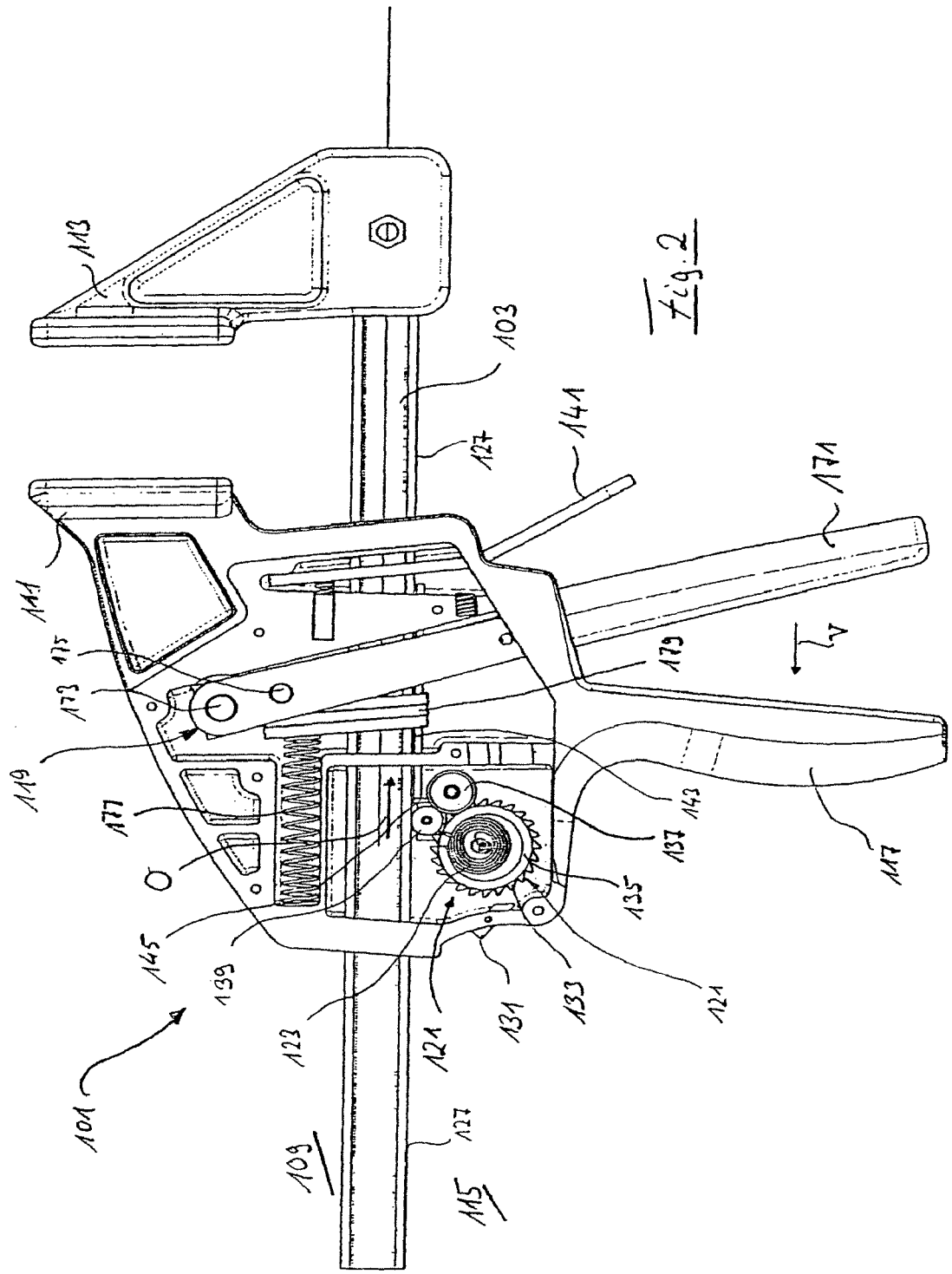
FIG. 2 is a side elevational view of another design according to the invention of a clamping and/or spreading tool, with clamping jaws in open position, illustrating a drive according to the invention in driving operation to open the clamping jaws.
Figure 3:
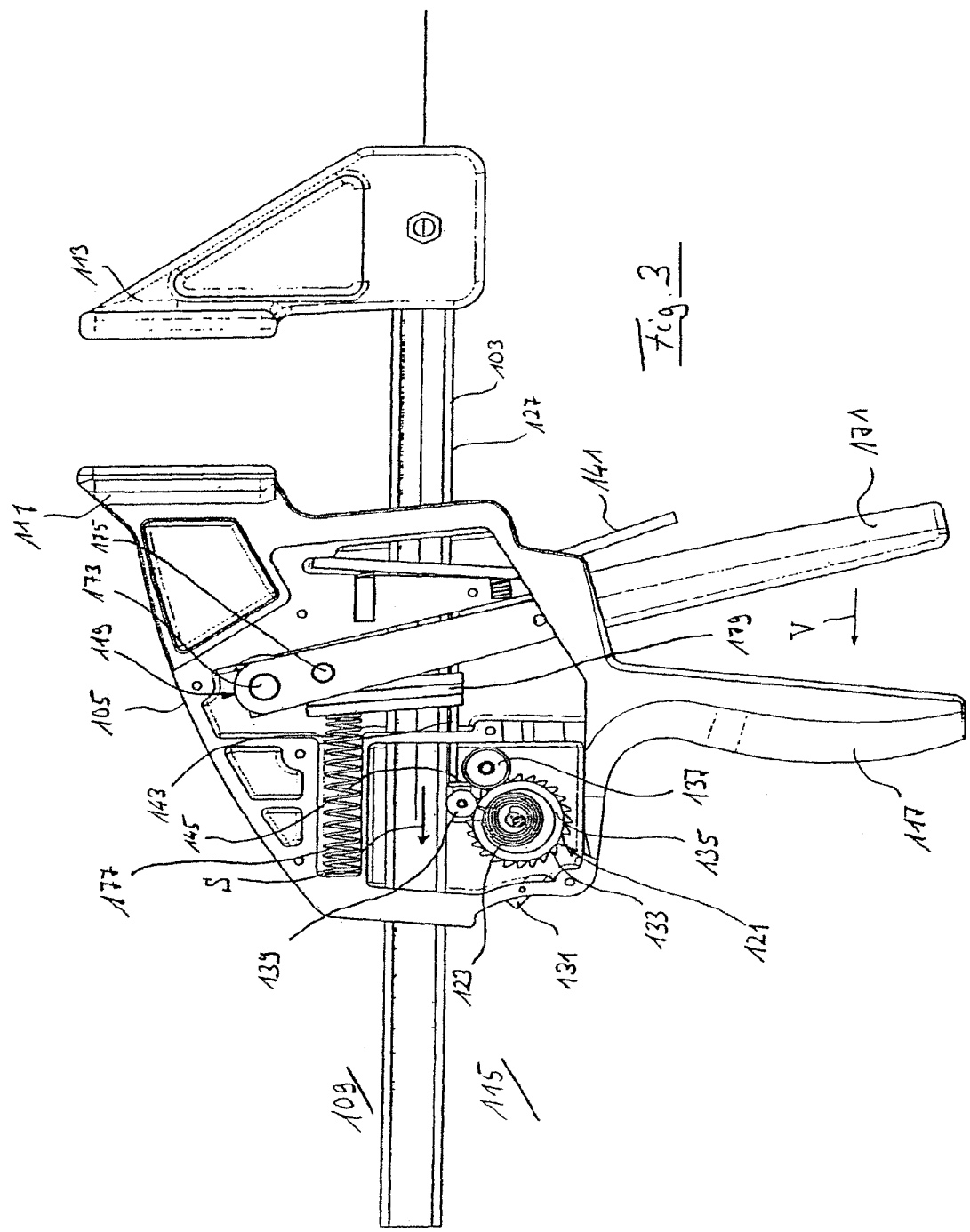
FIG. 3 is a side elevational view of the clamping and/or spreading tool shown in FIG. 2, illustrating the drive according to the invention in driving operation to close the clamping jaws.

The design according to FIGS. 2 and 3 presents a clamping and/or spreading tool which differs from the clamping and/or spreading tool according to FIGS. 1a and 1b substantially in that an alternative form of drive according to the invention is provided for the clamping and/or spreading tool. To facilitate reading the description of the figures, identical or similar parts as in the design shown in FIGS. 1a and 1b will be designated by the same reference numerals incremented by 100. It will not be necessary to explain the functioning of the components once again.

FIGS. 2 and 3 show two different drive configurations of a gear transmission of a drive according to the invention. With both configurations, the drive is activated by releasing a locking pawl 131 from ratchet teeth 133.

In the case of the gear configuration shown in FIG. 2 the clamping jaws 111 and 113 are opened. The opening direction of the displacement of the push and/or pull rod 103 is indicated by O.

The drive 121 according to the invention comprises a rotatable gear member which is driven as a drive wheel 135 via a torsion spring 123. The torsion spring 123 is mounted in such a way that the rotation of the drive wheel 135 will be clockwise.

An intermediate gear wheel 137 coupled for torque transmission with the drive wheel 135 is turned in counterclockwise sense by the drive wheel 135. By transmitting torque, the intermediate gear wheel 137 drives a driven wheel 139 designed as a gear component for converting rotary motion into translatory motion. The driven wheel 139 enters into power transmitting engagement with the edge 127 facing the actuating side 115 of the push or pull rod 103. In view of the fact that the driven wheel 139 is rotated in clockwise sense, the translatory movement imparted to the push or pull rod 103 moves the movable jaw 113 in opening direction O away from the stationary jaw 111.

All the torque transmissions may be effected either by friction lock or by form lock realized by toothing or by a combination of both.

Next, a preferred further development of the invention will be explained which relates to a mechanism for reversing the direction of displacement from displacement for opening, as shown in FIG. 2, to displacement for closing and vice versa, which mode is illustrated in FIG. 3.

The mechanism for reversing the direction of displacement comprises a switch means to be actuated by a draw-back lock. The draw-back lock serves to block shifting of the push or pull rod in opposed direction to the advance direction of the stepping gear transmission, as indicated by arrow V. The blocking effect of the draw-back lock is achieved with the assistance of the push or pull rod 103 by canting a passage zone of a release lever 141.

If it is intended to displace the push or pull rod 103 in opening direction O (see FIG. 2), i.e. opposite to the advance direction V of the gear stepping transmission 119, on the one hand, the release lever 141 must be actuated to cancel the blocking effect of the release lever acting in opening direction O due to the canting of the release lever 141 on the push or pull rod 103. Actuation of the release lever 141 is not shown in detail in FIG. 2. Slight tipping of the release lever 141 is sufficient to take away the blocking effect in opening direction O.

If a change is desired from direction of displacement O to S the release lever 141 must be pressed so hard (FIG. 3) as to activate a switch means in the form of a press bar 143 which is displaceable in its longitudinal direction and exerts pressure on a bearing 145 for the driven wheel 139. The bearing 145 makes sure the driven wheel 139 is shifted in longitudinal direction, i.e. closing direction, of the push or pull rod 103. Biasing means (not shown), especially a compression spring for the bearing presses the driven wheel 139 into the position illustrated in FIG. 2 where the driven wheel 139 and the intermediate gear wheel 137 mesh.

Actuation of the press bar 143, in other words activation of the switch means causes the bearing 145 of the driven wheel 139 to be shifted so that the driven wheel 139 will become free of the intermediate gear wheel 137 and enter into direct, torque transmitting contact with the drive wheel 135. Having this structural design, a rotation alternator is integrated in the drive which brings about reversal of the direction of rotation of the drive wheel 139. In the switched state (FIG. 3) the rotational movement of the drive wheel 135 driven by the torsion spring 123 drives the driven wheel 139 in counterclockwise sense, whereby the push or pull rod 103 is displaced continuously in closing direction S.

In both gear configurations shown in FIGS. 2 and 3, the drive wheel, the intermediate gear wheel, and the driven wheel all are biased in such a way at their points of torque transmission that sufficient normal force is generated to provide the frictional force required for transmitting torque. The contact pressure which must be exerted by the driven wheel 139 on the push or pull rod 103 is offered by the bias of the bearing 143 in the opening mechanism according to FIG. 2. With the closing mechanism according to FIG. 3, the necessary contact pressure is warranted by the actuating force imparted to the press bar 143 at the release lever 141.

Figure 4:
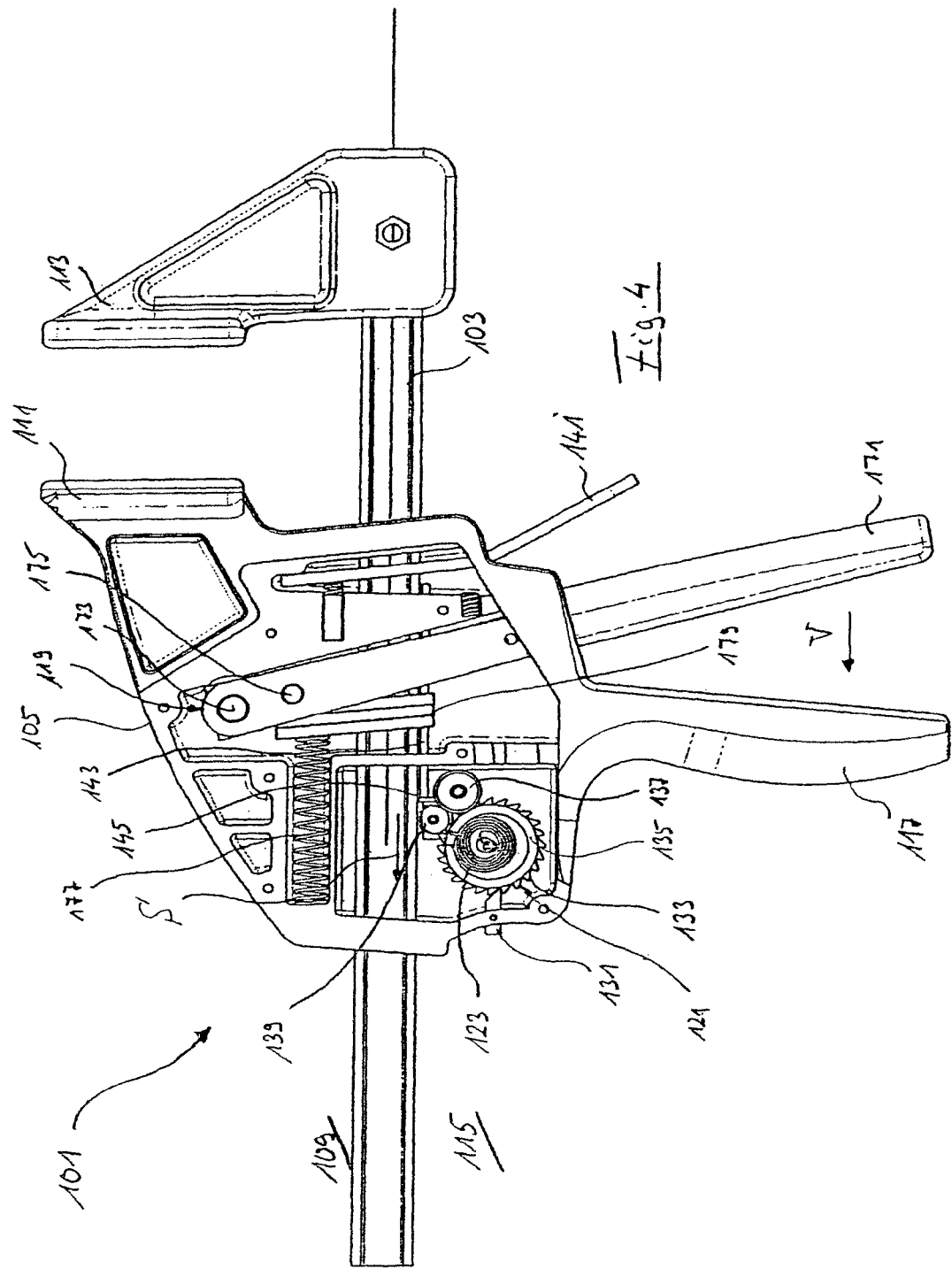
FIG. 4 is a side elevational view of the clamping and/or spreading tool shown in FIG. 2, illustrating a mechanism according to the invention for loading drive energy during closing movement of the jaws.

FIGS. 4 and 5 show a clamping and/or spreading tool 101 of which the structure is substantially identical with that of the clamping and/or spreading tool shown in FIGS. 2 and 3. To facilitate reading the description of the figures, identical or similar parts will be designated by the same reference numerals. Identical or similar parts need not be explained again.

The clamping and/or spreading tool 101 according to FIGS. 4 and 5 differs from the clamping and/or spreading tool shown in FIGS. 2 and 3 in the operating state of the drive. More specifically, the drive is deactivated by the pawl 131 which is caught in external toothing 133 of the drive wheel 135, thereby blocking release of the rotational drive energy stored in the torsion spring 123.

With this mode, the torsion spring 123 receives the rotational drive energy required for closing and opening. Movement of the push or pull rod 103 induces counterclockwise rotational movement at the drive wheel 135 through the gearing arranged between the push or pull rod 103 and the torsion spring 123, thus tightening the torsion spring 123.

The mechanism described for reversing the direction of displacement can perform the tensioning procedure regardless of a certain direction of displacement of the push or pull rod.

FIG. 4 illustrates the charging mechanism in an operational condition at which the torsion spring 123 is placed under tension by closing of the jaws 11, 113. As the push or pull rod 103 moves from right to left, i.e. in closing direction S, counterclockwise rotational movement is induced in the driven wheel 139, while clockwise rotational movement is induced in the intermediate gear wheel 137. Counterclockwise rotation of the drive wheel 135 tightens or winds up the torsion spring in counterclockwise sense.

Since it is necessary anyway to actuate the draw-back lock by means of the release lever 141 in order to open the clamping jaws, i.e. for movement of the push or pull rod from left to right, full actuation of the release lever 141 guarantees automatically that the rotation alternator will be activated through the press bar 143 and the driven wheel 139 will be disengaged from the intermediate gear wheel.

In this manner the drive according to the invention permits loading of potential energy into the drive energy reservoir, and the charging procedure can be performed both during opening and closing. Therefore, the torsion spring of the drive is tensioned automatically when the stepping gear transmission causes the movable jaw to approach the stationary jaw. Charging by reciprocating movements of the push or pull rod is possible.

Another design of a clamping and/or spreading tool according to the invention with an alternative design of a drive for continuous displacement of a push or pull rod is presented in FIGS. 6a, 6b, 7a, 7b, and 8a, 8b. To facilitate reading, components that are identical or similar to the above designs are given the same reference numerals, incremented by 100 or 200. Identical or similar parts like their functioning need not be explained again.

The design according to FIGS. 6a to 8b differs from the above designs in the embodiment of the drive. A means is provided for pulling the push or pull rod from an open position, as shown in FIG. 7a, into a closed position, as shown in FIG. 6a. In the design according to FIGS. 6a to 8b the pulling means is embodied by a torsion spring 223 coupled to a strand 245 which is adapted to be wound up. The free end of this coilable strand 245 is attached to the push or pull rod 203. That is accomplished by a fastening means 247 which is adapted to be detached from the push or pull rod 203 by way of a release button 248 so as to relocate the fastening means 247 of the coilable strand 245 along the push or pull rod 203. For example, a very long push or pull rod (not shown in the drawing) is provided in clamping and/or spreading tools for particularly wide articles 249. In order to avoid having to use a pulling means of corresponding length, the fastening means 247 may be placed closer to the support 205.

A bobbin 251 is provided for the coilable strand 245 which is wound on the bobbin when the clamping jaw 213 is pulled into closed position. The coil strand 245 extends from the bobbin 251 through a guide member 253 in the vicinity of the bobbin, offset towards the movable jaw 213, to guide the coil strand 245 into a depression 255 formed in the push or pull rod 203. From the guide member 253, the coil strand 245 extends along the push or pull rod 203 in the depression 255 thereof to the fastening means 247.

The coil strand 245 may be in the form of a filament or a metal reinforced textile thread. Small diameter nylon strings likewise may be used as coil strand.

The push or pull rod 203 with its depression 255 to receive the coil strand 245 is configured like an I-beam, as shown in FIG. 7b, having two lateral depressions 255. The dimensioning of the depressions is such that the coil strand can slide along without contacting the casing 207 of the support 205.

A special inventive measure resides in associating a damping means 257, diagrammatically indicated in FIGS. 6a, 7a, and 8a, with the rotatably supported bobbin 251 which is coupled to the torsion spring 223 so as to drive it in rotation.

The damping means 257 is designed to dampen the force acting on the movable jaw 213 under the tension exerted by the pulling means so as to make sure a controllable closing rate of the movable jaw 213 is obtained. The desired closing rate depends on the desires of the persons handling the clamping and/or spreading tool 201. The damping means 257 may be based on the principle of friction loss or splashing loss of the work fluid.

The damping means 257 is especially advantageous if a torsion spring should be used which offers non-nonlinear provision of power. In that event the damping means 257 may be harmonized with the torsion spring in such manner that the power transmission becomes linear.

In the drive according to the invention shown in FIGS. 6a to 8b a mechanism is realized for storing and loading energy by means of the torsion spring. The torsion spring 223 contains the lowest level value in the reservoir when the clamping jaws 211 and 213 are closed. Pulling the clamping jaw 213 away from the stationary jaw 211 by light actuation of the release lever 241 of the draw-back lock to loosen the clamping and/or spreading tool, tightens the torsion spring 223 through the coil strand 245. As the release lever 241 is let go, springs 259 and 261 will set the release lever 241 into a canted position with respect to the push or pull rod 203. The frictional and tilting forces resulting with this canted position are so great that independent closing of the clamping jaw by the pulling means is out of the question. The frictional or tilting force needed at the release lever 241 to accomplish that can be adjusted in consideration of the spring rate of springs 259 and 261.

When the operator actuates the release lever 241 the frictional or tilting forces at the push or pull rod are set free, whereby the rotational drive energy stored in the torsion spring 223 is released and the movable jaw is drawn towards the stationary jaw 211 by the coil strand 245. The operating condition of closing is illustrated in FIGS. 8a and 8b. The pulling means continues to act until the article 249 has been grasped by the jaws 211, 213 (FIGS. 6a, 6b) and the pull of the torsion spring 223 no longer suffices to cause further shifting of the push or pull rod 203 in closing direction S.

Upon termination of the rapid closing process by the pulling means according to the invention, great clamping forces can be imparted to the article 249 through the stepping gear transmission 219 of small step width, to be described in greater detail below.

FIGS. 9a to 9d show another clamping and/or spreading tool according to the invention. To facilitate reading the description of the figures, identical or similar components are marked by the same reference numerals, incremented by 100, 200, or 300. Identical or similar parts need not be explained again.

The design of the clamping and/or spreading tool 301 according to FIGS. 9a to 9d differs from the design of the clamping and/or spreading tool according to FIGS. 6a to 8b in that the means for pulling the movable jaw 313 on to the stationary jaw 311 is performed exclusively by means of a torsion spring 323, in other words without using a coil strand connecting the torsion spring with the push or pull rod 303 or the movable jaw 313.

The torsion spring 323, as designed according to FIGS. 9a to 9d, is a spiral band spring supported for rotation in the casing 207 of the support 205. The spiral band spring may be unwound so as to store rotational drive energy, the unwound portion 365 being received in the depression 355 of the push or pull rod. For winding up the unwound portion 365 of the spiral band, the base 367 of the spiral band spring is rotatably supported on the support 305. The free end of the spiral band portion 365 which can be unwound is secured to the push or pull rod 303 or to the movable jaw 313. The respective fastening means (not shown) for the spiral band portion 365 is detachable, making the fastening means relocatable along the push or pull rod 303, especially so as not to unwind the spiral band spring too much when the articles to be clamped are great (not shown in the drawing).

The spiral band spring has the special advantage of imparting a uniform linear driving force, irrespective of the distance covered, to the movable jaw 313 or to the push or pull rod 303.

The spiral band spring, therefore, fulfills both the task of a pulling means and that of a damping means for providing uniform closing rates.

To receive the spiral band base 367 on which the spiral band portion 365 is wound, the casing 307 may include a lateral opening through which the base 367 including the wound spiral band portion 365 may protrude, as illustrated in FIGS. 9b and 9c.

The closing mode as well as the actuation of the clamping and/or spreading tool 303 including the spiral band spring essentially correspond to the clamping and/or spreading tool 203 which has been described with reference to FIGS. 6a to 8b with the pulling means and coil strand used in that case.

Both clamping and/or spreading tools described in FIGS. 6a to 8b and FIGS. 9a to 9d may be equipped with a mechanism (not shown) for loading an energy reservoir when the one-hand vise is being closed. This combination of loading mechanisms is required especially when also an additional drive is integrated in the clamping tools according to FIGS. 6a to 8b and 9a to 9d, in particular to be able to displace the push or pull rod in both longitudinal directions.

Following the closing movement of the movable jaw 313 caused by the spiral band spring, the desired great clamping force between the jaws 311 and 313 can be built up by means of the stepping gear transmission 319 of small step width.

Next, the structure and functioning of the stepping gear transmission of small step width will be described. The stepping gear transmission substantially corresponds to the one indicated by the applicant in German patent application DE 10335365.8.

The stepping gear transmission 19 to 319 is designed to provide power operation of the clamping and/or spreading tool 1 to 301 by which the push or pull rod 3 to 303 is displaceable in small step widths in feeding direction V. During this power operation a bell crank of a drive arm 71 to 371 is effective which is defined by the distance of a swivel bearing 73 to 373 of the drive arm 71 to 371 and a power input pin 75 to 375. In view of the fact that the actuating lever of the drive arm 71 to 371 is much greater than the bell crank, clamping forces can be generated which are ten times bigger than those obtainable with the stepping gear transmission disclosed in U.S. Pat. No. 6,568,667.

The compression spring 77 to 377 housed in the casing 307 constantly presses an entraining slide element 79 to 379 against the power input pin 75 to 375 of the drive arm 71 to 371. Moreover, the compression spring 77 to 377 serves to move the entraining slide element 79 to 379 into a constantly canted position with respect to the push or pull rod 3 to 303. This is achieved due to the fact that the pressure input location of the compression spring 77 to 377 is located closer to the push or pull rod 3 to 303 than the power input pin 75 to 375, whereby the entraining slide element 79 to 379 is swung around the power input pin 75 to 375 in counterclockwise sense until the entraining slide element 79 to 379 cants with respect to the push or pull rod 3 to 303. Thus it is made sure that actuation of the drive arm 71 to 371 in swinging motion around the swivel bearing 73 to 373 directly causes displacement of the push or pull rod, whereby clamping forces between the clamping jaws 13, 15 to 313, 315 can be generated directly. Subsequent to a stroke by the drive arm 71 to 371, the operator must release the latter, whereby the compression spring 77 to 377 lifts the entraining canting of the entraining slide element 79 to 379 with respect to the push or pull rod 3 to 303 and the drive arm 71 to 371 is returned into the starting position, shown as an example in FIG. 9*a*.

The favorable leverage ratios obtained for the stepping gear transmission of small step width is realized, above all, by both the swivel bearing 73 to 373 and the power input pin 375 being placed at the clamping side 9 to 309.

The features disclosed in the specification above, in the figures and claims may be significant to implementing the invention in the various embodiments, both individually and in any combination. For instance, mutual exchange and combination of the various drive mechanisms are possible. It is quite within the concept of the invention, for example, to combine the damping means (257) with torsion spring drives, as illustrated in FIGS. 1*a* and 1*b* or 2 to 5.

The invention claimed is:

1. A clamp, comprising:
   a rod including a first longitudinal depression;
   a first jaw coupled to the rod;
   a second jaw coupled to the rod; and
   a spiral band spring rotatably mounted in the first jaw, a free end of the spiral band spring being secured to the rod, and an unwound portion of the spiral band spring being disposed within the first longitudinal depression, the spiral band spring imparting a linear driving force on the rod.

2. A clamp according to claim 1, wherein the second jaw is removably coupled to the rod.

3. A clamp according to claim 1, wherein the spiral band spring has an axis of rotation that is substantially perpendicular to a longitudinal axis of the rod.

4. A clamp according to claim 1, wherein the spiral band spring is at least partially wound on a bobbin located in the first jaw.

5. A clamp according to claim 4, wherein the bobbin is rotatably supported in the first jaw.

6. A clamp according to claim 1, wherein the spiral band spring is charged with potential energy when the rod is moved relative to the first jaw.

7. A clamp according to claim 1, further comprising a resiliently biased breaking lever located in the first jaw, the breaking lever being coupled to a release lever that extends outside of the first jaw.

8. A clamp according to claim 7, further comprising a biasing element within the first jaw, the biasing element biasing the breaking lever to a canted position with respect to the rod, the canted position of the breaking lever preventing movement of the rod in one direction with respect to the first jaw.

9. A clamp according to claim 1, wherein the rod has an I-beam cross-sectional shape.

10. A clamp according to claim 1, further comprising a second longitudinal depression located on an opposite side of the rod from the first longitudinal depression.

11. A clamp, comprising:
    a push/pull rod having a first longitudinal depression;
    a first jaw coupled to the push/pull rod;
    a second jaw coupled to the push/pull rod; and
    a motor rotatably mounted in the first jaw, an unwound portion of the motor being disposed in the longitudinal depression, and a free end of the motor being attached to the push/pull rod, the motor imparting a linear driving force to the push/pull rod.

12. A clamp according to claim 11, wherein the second jaw is removably attached to the push/pull rod.

13. A clamp according to claim 12, wherein the motor is a spiral band spring.

14. A clamp according to claim 13, wherein the spiral band spring is positioned on a rotatable spool that is located within the first jaw.

15. A clamp according to claim 14, wherein the rotatable spool is a bobbin.

16. A clamp according to claim 15, wherein the bobbin has an axis of rotation that is substantially perpendicular to a longitudinal axis of the push/pull rod.

17. A clamp according to claim 11, wherein the push/pull rod further comprises a second longitudinal depression located on an opposite side of the push/pull rod from the first longitudinal depression.

18. A method of manufacturing a bar clamp, comprising:
    providing a bar with a longitudinal depression;
    attaching a first jaw to the bar;
    attaching a second jaw to the bar;
    rotatably mounting a spiral band spring in the first jaw;
    unwinding a portion of the spiral band spring and disposing the unwound portion of the spiral band spring in the longitudinal depression; and
    attaching a free end of the spiral band spring to the bar.

* * * * *